(12) United States Patent
Yuen

(10) Patent No.: US 9,474,414 B2
(45) Date of Patent: Oct. 25, 2016

(54) INTERACTIVE HEATING AND COOKING APPARATUS AND DISPOSABLE TRAY SYSTEM THEREFORE

(71) Applicant: Heong Meng Yuen, Macquarie Links (AU)

(72) Inventor: Heong Meng Yuen, Macquarie Links (AU)

( * ) Notice: Subject to any disclaimer, the term of this patent is extended or adjusted under 35 U.S.C. 154(b) by 354 days.

(21) Appl. No.: 14/134,048

(22) Filed: Dec. 19, 2013

(65) Prior Publication Data

US 2014/0174427 A1    Jun. 26, 2014

(30) Foreign Application Priority Data

Dec. 19, 2012  (AU) .............................. 2012905552

(51) Int. Cl.
*A47J 37/07* (2006.01)
*A47J 37/06* (2006.01)

(52) U.S. Cl.
CPC ........... *A47J 37/0781* (2013.01); *A47J 37/067* (2013.01); *A47J 37/0682* (2013.01); *A47J 37/0713* (2013.01)

(58) Field of Classification Search
CPC ............... A47J 37/067; A47J 37/0781; A47J 37/0682; A47J 37/0713; A47J 37/0786
See application file for complete search history.

(56) References Cited

U.S. PATENT DOCUMENTS

| 2,880,860 A | 4/1959 | Gardner et al. |
| 3,256,806 A | 6/1966 | Jordan |
| 3,682,154 A | 8/1972 | Mollere |
| 3,834,527 A | 9/1974 | Howe |
| 5,655,435 A | 8/1997 | Rachesky |
| 2005/0109331 A1* | 5/2005 | Chao .................... A47J 37/0781 126/25 R |

FOREIGN PATENT DOCUMENTS

CN     201640972 U    11/2010

* cited by examiner

*Primary Examiner* — Alfred Basichas
(74) *Attorney, Agent, or Firm* — Harness, Dickey & Pierce, P.L.C.

(57) ABSTRACT

An interactive heating and cooking apparatus (1) including a support structure (2) defining an upper support region (4) with a fire receptacle (9) extending upwardly from the upper support region. The fire receptacle is bound at least partially by a peripheral shield element (10) adapted to allow at least a portion of the light from a fire in the fire receptacle to pass there through. The apparatus further includes at least one cooking facility (11) attached to the upper support region, the cooking facility including a cooking surface adjacent the peripheral shield element, which surface is positioned to receive light from the fire, and at least one support surface adjacent the cooking surface. An expandable disposable cooking apparatus including a drip tray element formed from a longitudinally extendible concertina type generally channel shaped structure is also disclosed for use with, or independent of, the interactive heating and cooking apparatus (1).

13 Claims, 9 Drawing Sheets

INTERACTIVE HEATING AND COOKING APPARATUS AND DISPOSABLE TRAY SYSTEM THEREFORE

FIELD OF THE INVENTION

The present invention relates to a multi-purpose interactive heating and cooking apparatus and a disposable tray suitable for use therewith. The apparatus of the invention has been developed primarily for family use and for entertaining at home with friends and will be described with reference to embodiments designed for this purpose. However, it will be appreciated that the invention is not limited to this particular application and could readily be adapted for use in commercial establishments.

BACKGROUND OF THE INVENTION

Any discussion of the prior art throughout the specification should in no way be considered as an admission that such prior art is widely known or forms part of common general knowledge in the field.

Barbeques have become extremely popular worldwide, and offer an excellent way for people to cook while enjoying the outdoors. While the interest remains in portable barbeques for picnics and camping, more and more people are using larger fixed barbeques in their homes. Not only does this facilitate more enjoyment of their outdoor entertaining areas, it also helps to keep cooking odours and any associated mess away from the inside kitchen.

While over the years a wide range of different barbeques have evolved, with extensive variations and combinations of additional features including cooking hoods, storage cabinets, preparation surfaces, wok burners and the like, most have as the main feature a primary heated cooking surface. The majority of these have access from only one side and are designed to accommodate one or two people acting as the designated cooks or chefs during the cooking process. Furthermore, most barbeques are designed for location against a wall out of the way, and are usually very utilitarian in their design.

More recently there has been a surge in the interest and use of fire pits, in a wide variety of shapes and forms, as a centre piece for people to gather around and keep warm when socialising, particularly at night. These fire pits are powered by a range of different fuels including wood and gas, and, in addition to providing heat and light, can contribute a resort like atmosphere and charm to an entertainment area. However, in homes and establishments with limited space they represent yet another article to locate and store when not in regular use.

SUMMARY OF THE INVENTION

According to a first aspect of the present invention there is provided an interactive heating and cooking apparatus including:

a support structure defining an upper support region;

a fire receptacle extending upwardly from the upper support region, the fire receptacle being bound at least partially by a peripheral shield element, the shield element being adapted to allow at least a portion of the light from a fire in the fire receptacle to pass there through;

at least one cooking facility attached to the upper support region, the cooking facility including a cooking surface adjacent said peripheral shield element, which surface is positioned to receive light from the fire; and at least one support surface adjacent the cooking surface.

Preferably, the support surface is sized to support cooking and eating utensils and is also positioned to receive light from the fire. The support surface may also be adapted to include, or incorporate, accessories such as utensil holders or sauce holders etc.

In preferred forms, the apparatus is configured for positioning in the middle of a selected entertaining area with access from all or most peripheral edges. In these embodiments the fire receptacle is approximately centrally located on the support structure with the shield element extending around most or all of the periphery of the fire receptacle, with the cooking surface(s) and support surfaces(s) extending around the perimeter of the shield to enable access to cooking and support surfaces all around the apparatus by a large number of people. While the currently preferred embodiments are either rectangular or circular in footprint, other configurations, regular or irregular, can be provided.

In one preferred embodiment, the apparatus includes one or more removable covers for conversion of all or part of the apparatus into a table surface. For example, in one embodiment, the protruding fire pit shield element is removable such that a single piece cover can be applied which turns the entire apparatus into a table which is ideal for summer eating. In another embodiment, an annular cover element is supplied which seats over the cooking surfaces or cooking and support surfaces to provide an extended peripheral table region through which the fire pit region can still extend and be used. In such embodiments, an optional additional cover may also be provided which goes separately over the fire pit region when that is not in use, which can be used with or without the peripheral cover. The cover elements, like the support surface, may also optionally include, or be adapted to receive, accessories such as utensil holders or sauce holders etc.

The inventive structure enables the apparatus to become multi-purpose, in that all users can all enjoy the ambience of the fire, which is fully adjustable to suit weather conditions, while cooking their food to their particular liking so that it can be enjoyed perfectly cooked and fresh and hot. Furthermore, there is no need for designated cooks, who ordinarily would miss out on socialising with the larger group while the food is being cooked en masse. Also, with addition of the optional cover elements the apparatus can be converted to increase the table area, making it perfect for dining even when the barbeque facilities are not needed.

In a first preferred embodiment the apparatus is configured to be powered entirely by gas, either via bottled gas such as butane and/or by connection to a natural gas mains supply.

In such embodiments, a single gas inlet or source can provide gas, via a distribution manifold and appropriate valves and regulators, to the fire receptacle and each of the cooking facilities, thereby enabling each region to be independently controlled but centrally fuelled from a single source. In alternative embodiments, separate fuel sources may be provided for separate regions such as the cooking regions and the fire receptacle.

In one preferred form where the fire receptacle is gas powered, the receptacle includes a media support element in the form, for example, of a base or grate, which can be used to support non combustible aesthetic features such as rocks or glass pebbles or the like through which the flames can extend in use. This feature enables individual tailoring of the appearance of the fire portion to suit the style and taste of different users and the decor and tone of their entertaining area.

In one embodiment a variety of cooking surfaces are provided, such as a combination of open grates and solid hot plates. In one particularly preferred embodiment, one or more of the cooking facilities includes an opening above a gas burner that is adapted to receive and support an at least partially removable cooking structure that includes an upper grate or plate optionally with a perforated drip tray located below. This cooking structure can be made from solid heavy materials which can be repeatedly re-used and at least partially dismantled to facilitate cleaning as is already known. Suitable materials for the cooking structure include cast iron and stainless steel and any other suitable materials already known for use in barbeques. However, porcelain, and more particularly full bodied porcelain, is a particularly preferred material, as being easy to clean, generally non porous and durable without needing any undesirable surface coatings etc.

However, in alternative embodiments, some or all of the cooking structure is manufactured from heavy grade aluminium foil or other suitable materials so as to be disposable as described in more detail below.

In another embodiment, some or all of the components of the apparatus is configured to run on solid fuel such as charcoal or wood. In such embodiments, access is provided for adding fuel and removing ash products for re-use. In yet further embodiments some or all of the components, particularly the fire element, may be configured to run on liquid fuels such as methanol.

In embodiments that have a generally centrally located fire receptacle and preferably a regular footprint, be it, for example, circular, hexagonal or octagonal, the apparatus may include a "lazy susan" type annular rotating surface, preferably between the peripheral support surface and the cooking surfaces. This will assist in distributing different foods and sauces and the like to the users.

In preferred forms the peripheral shield element is made from tempered glass so as to allow light to pass through while shielding users from direct heat or flame onto the cooking surfaces. However, other shield structures may be used, including perforated metal and ceramics so long as ideally light from the fire can still be seen and projected onto the surrounding cooking and serving/preparation surfaces.

Dependent on the materials used for the different elements of the interactive heating and cooking apparatus and the fuel types to be used, it may be desirable to also include some form of fire protection material in the apparatus, particularly between some or all of the following items including: the fire receptacle, the shield element (particularly if made of glass), the cooking facility and the support surface adjacent the cooking facility. While there are numerous suitable fire protection materials, silicone based materials of the kind used for fire protection in the aerospace industry are particularly preferred. The material may be in sheet form and can be inserted in locations at or between some of the adjacent elements discussed above.

It may also be desirable to include heat insulation materials to limit the heat transfer to areas where it is not wanted or desirable and concentrate it within areas where it is required and beneficial. Again there are numerous suitable materials available including glass fibre batting materials and the like.

According to a second aspect of the invention there is provided an expandable disposable cooking apparatus including a drip tray element formed from a longitudinally extendible concertina type generally channel shaped structure.

Preferably the concertina type channel shape structure is fabricated from a flexible fire resistant material such as aluminium foil. In one particularly preferred form, the foil type material is reinforced with wire or rod like elements. The reinforcements may be in the form of a continuous wire, or comprise a series of separate distinct u-shaped elements, or any other arrangement which will permit the apparatus to be collapsed when not in use and easily expanded into position when required.

In preferred forms, the channel shaped structure incorporates end formations that extend at least partially across the channel section so as to prevent leakage of product collected in the tray during use.

The drip tray is ideally configured to support and, optionally, retain, a cooking surface in the form of a mesh element that will extend across the top opening of the expanded tray. Preferably, the mesh element is similarly collapsible and extendable during use. Such support may be in the form of flange formations that extend either across or away from the channel opening during use.

In the most preferred form, the mesh element is longitudinally extendible and integrally attached to the tray element so as to form a complete cooking surface and drip tray apparatus. The mesh may be connected to the tray element by any suitable means including crimping, welding, gluing etc.

The expandable disposable cooking apparatus above can be used in part, or in its totality, as part of the cooking facilities for the first aspect of the invention. In such embodiments, tray only versions can be inserted into the openings below the grates provided with the interactive apparatus, making it easy to clean below the grates after use. Alternatively, versions that include the tray and mesh can be used in place of the reusable grates, making cleaning after use a simple case of disposing the used disposable tray and mesh and replacing these with new ones when the apparatus is next to be used. In such cases the apparatus of the first aspect is provided with cantilevered burner manifolds with an access opening adjacent the free end. In such instances the tray and mesh apparatus is inserted in its collapsed state into the access opening and expanded over the manifold in a similar manner to putting on a sock. For long lengths of burner, several separate disposable apparatuses can be inserted and if necessary one deformed slightly into the end of the adjacent one to provide a nesting interaction.

It will also be appreciated that the disposable cooking apparatus, particularly the versions with integral mesh cooking surface, lends itself to use separate from the apparatus of the first aspect of the invention. For example, the tray, once expanded could be filled with charcoal or other fuel elements and thereby create an easily transported barbeque device that can be simply thrown away or recycled after use. Furthermore, the fact that the apparatus can be stored in a collapsed state makes storage easy and efficient. This would enable people to keep packages in the car ready for impromptu use when travelling or on a picnic. In other embodiments, simple supported bar like gas burner manifolds could be produced for use with the disposable cooking apparatus. The end result would still be a structure that is far more compact than most portable barbeques and would eliminate any issues relating to transporting dirty barbeque equipment in the car after use, as the elements contaminated with the food can simply be disposed.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENT(S)

Figure 1:
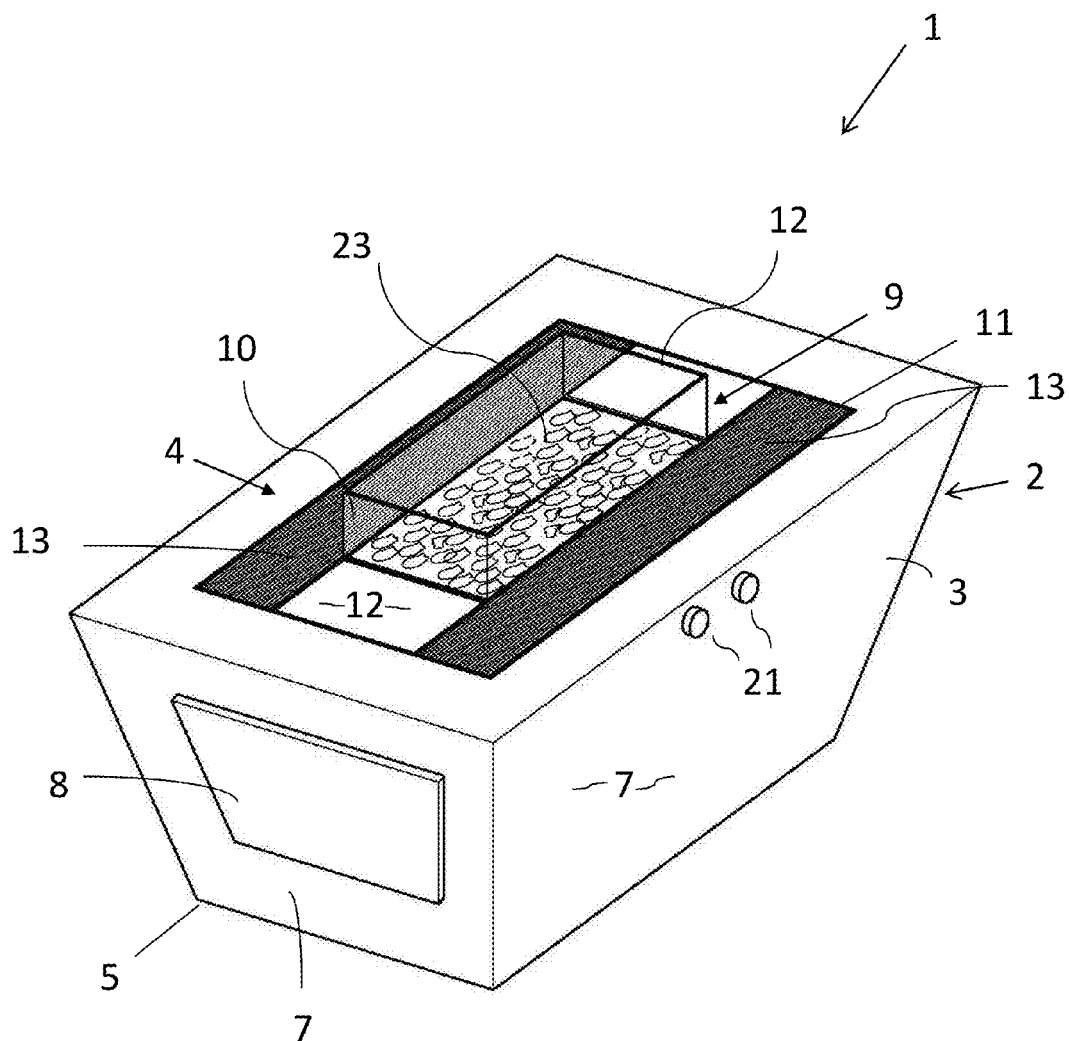
FIG. 1 is a front/top perspective view of a first generally rectangular embodiment interactive heating and cooking apparatus according to the first aspect of the invention.

Referring firstly to FIGS. 1 to 4, there is shown a first embodiment interactive heating and cooking apparatus 1 according to the first aspect of the invention. As can been seen from FIGS. 1 and 2, the apparatus has a generally rectangular profile in plan view. The apparatus includes a support structure shown generally at 2 which in this particular embodiment, takes the form a rectangular box structure 3 which tapers downwardly from an upper support region 4 to its base 5.

In the illustrated form, the box 3 is constructed from a structural frame 6 to which are attached decorative external panels 7. Generally, these panels will include an access door of some kind such as the sliding cover 8 shown in FIG. 1.

The panels may be purely functional to provide weather protection, but can also include decorative elements by being clad, for example, in sheets of stainless steel or beaten copper or a stone look finish—whatever is preferred.

Figure 5:
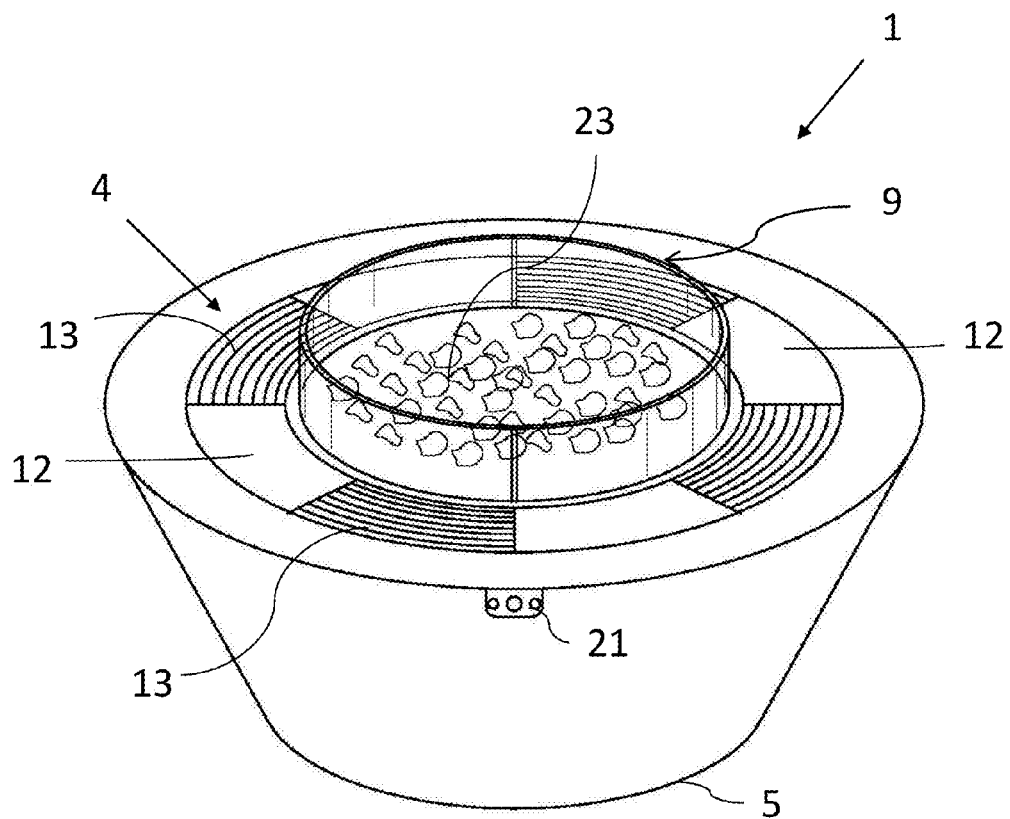
FIG. 5 is a top perspective view of a second embodiment interactive cooking and heating apparatus according to the first aspect of the invention.
Figure 6:
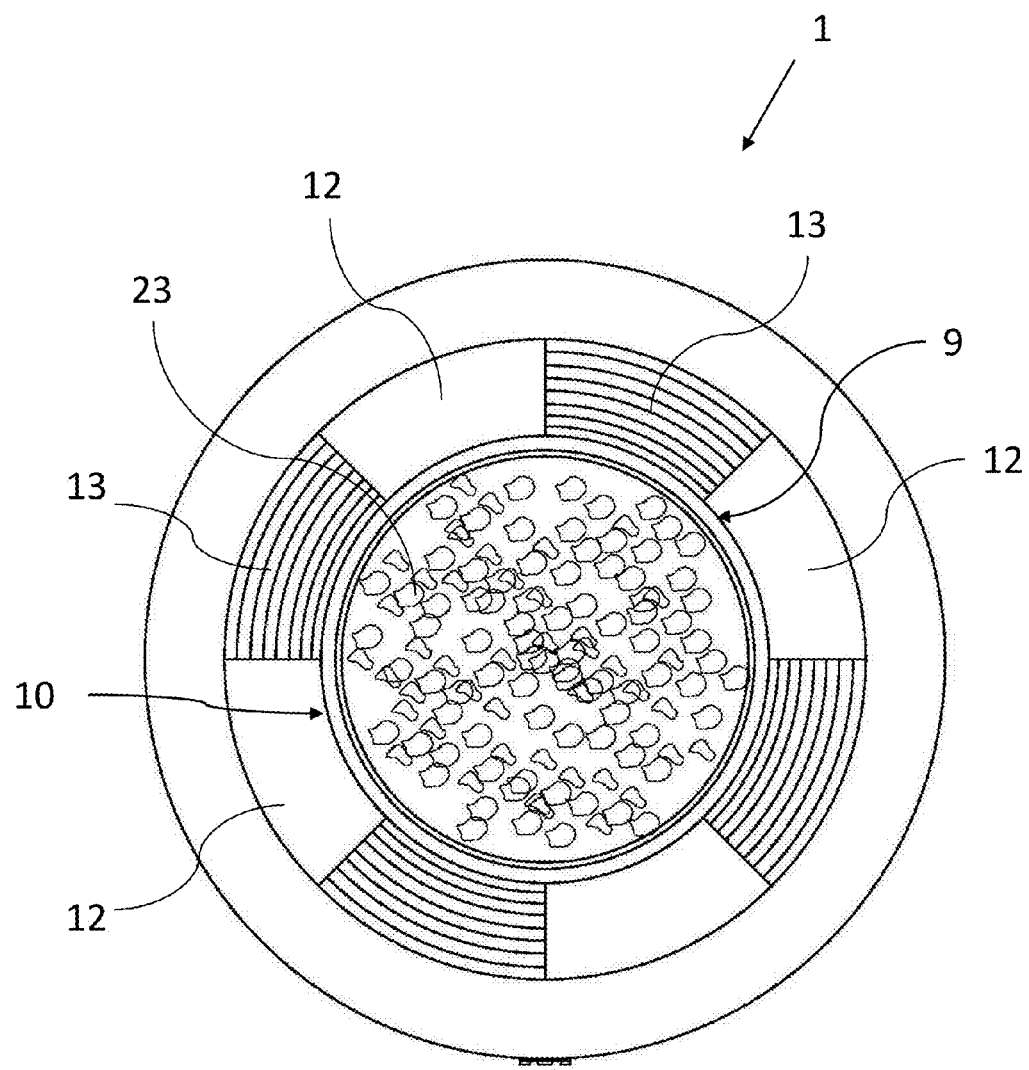
FIG. 6 is a plan view of the apparatus shown in FIG. 5.
Figure 7:
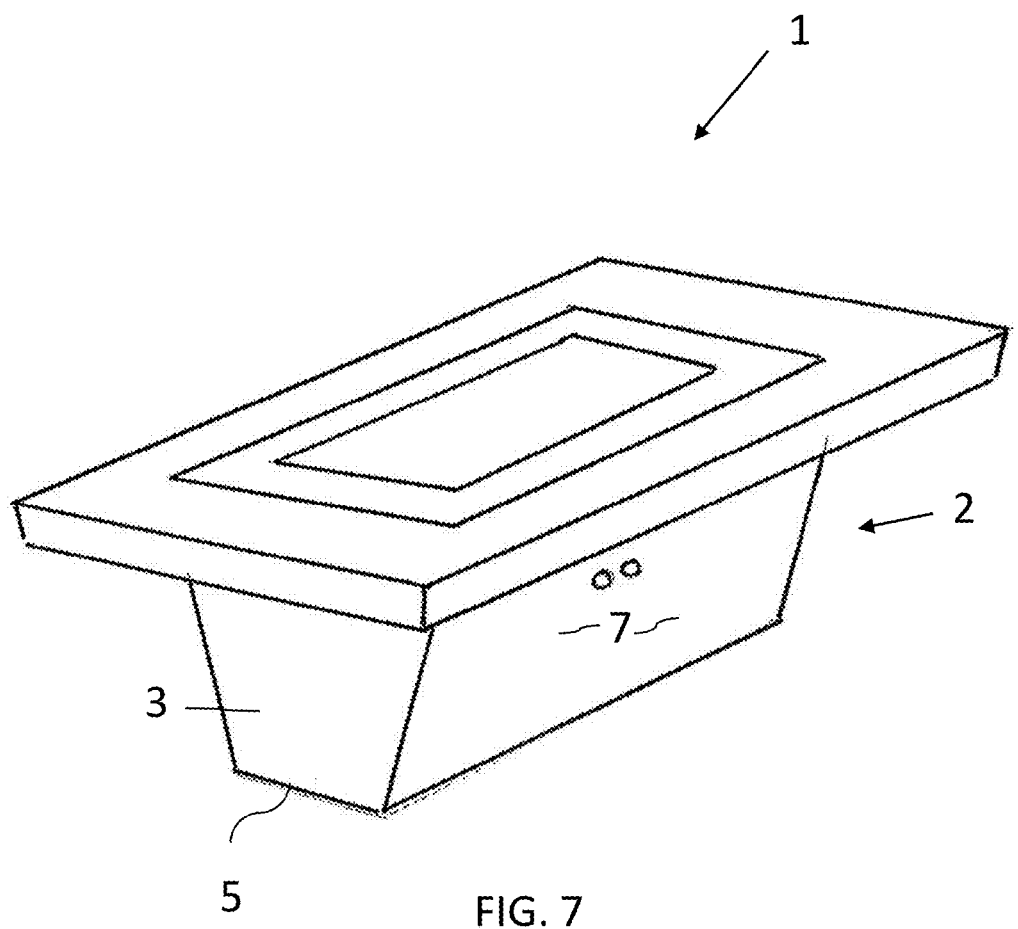
FIG. 7 is a front perspective view of a third generally rectangular embodiment interactive heating and cooking apparatus according to the first aspect of the invention (without the fire receptacle detail) illustrating a table top type configuration that facilitates seating.

It will also be appreciated that while the embodiments illustrated in FIGS. 1 to 6 have the support structure extending to the periphery of the upper support region, this is not essential and indeed it may be advantageous to have the upper support region extend peripherally beyond the support structure as shown in FIG. 7 to enable users to sit at the apparatus on stools or the like if that is required.

Extending at least partially upwardly from the upper support region 4 is a fire receptacle 9 which is configured to create a fire pit. This fire receptacle is bounded peripherally by a shield element 10. In the preferred form, this shield element comprises 6 to 8 mm tempered glass which is ideal in terms of shielding users from direct flames while at the same time allowing a large portion of the light from the fire in the fire receptacle to pass through and illuminate the surrounding areas. However, in other embodiments, the shield element 10 may be formed from other suitable materials, such as perforated metals or ceramics or any other materials and structures that can withstand heat and flame whilst still allowing some light to pass through. When using glass, some of the light from the fire receptacle will still be transferred to the surrounding area even if it does not extend a significant height from that surrounding area due to transfer through the glass.

Also connected to the upper support region 4 is a cooking facility shown generally at 11 which in this preferred form, includes a combination of solid hot plates 12 and open barbeque grates 13.

A support surface or table region 14 is provided adjacent the cooking surfaces 12 and 13 for locating containers of food to be cooked, as well as eating plates and drinks etc.

Referring next to FIGS. 5 and 6, there is shown a second embodiment of the interactive heating and cooking apparatus according to the first aspect of the invention. Wherever possible, like reference numerals have been used to denote corresponding features.

Figure 2:
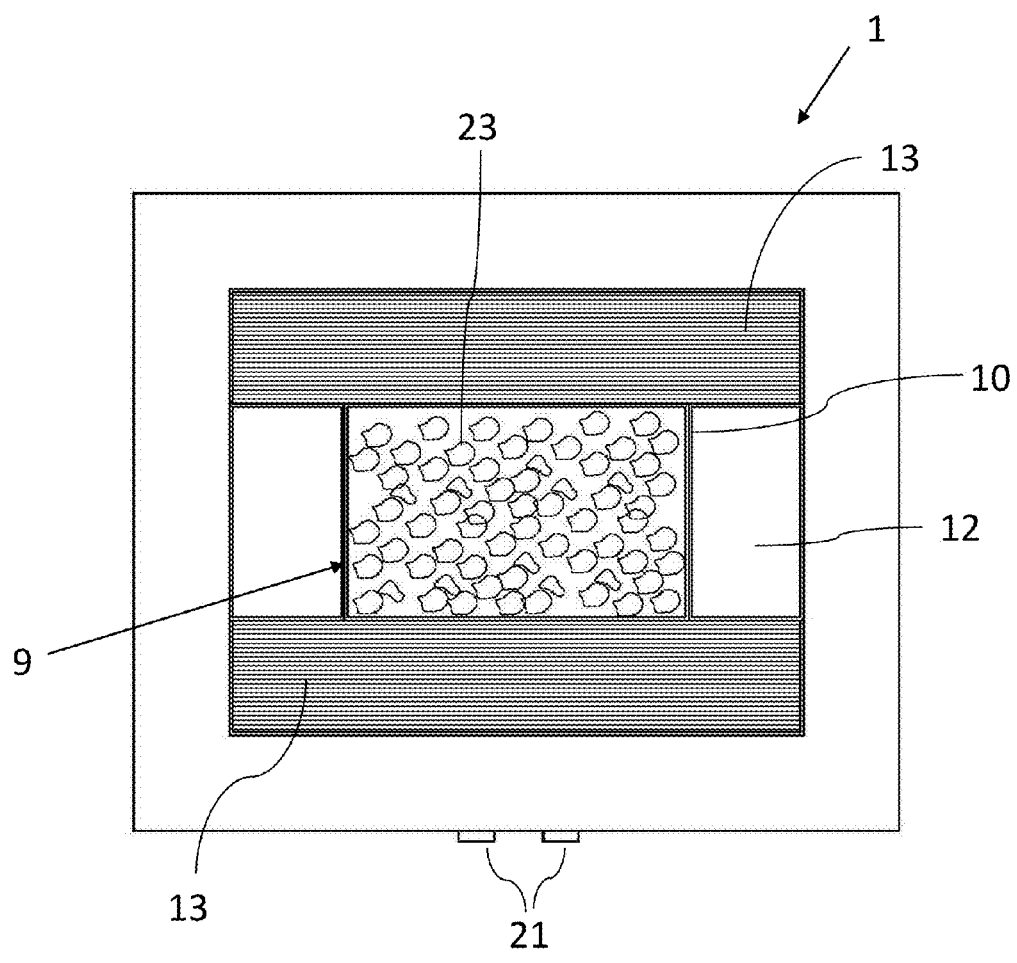
FIG. 2 is a plan view of the apparatus shown in FIG. 1.

As can be seen, this second embodiment is very similar to structure and function to that shown in FIGS. 1 and 2 but differs mainly in the aesthetic form being generally circular in plan view as opposed to rectangular. Another difference resides in the provision of a larger number of solid hot plates 12 that alternate with a similar number of grates 13. However, it will of course be appreciated that the embodiment of FIG. 1 could similarly be varied to include additional solid hot plates such as at a location mid-point along the longitudinally extending open barbeque grates 13. The hot plates could also be discontinuous around the periphery of the shield and be interspaced with additional support surface or table regions on to which things can be placed.

Common to both of the embodiments illustrated, is the general arrangement whereby the fire pit or receptacle 9 is centrally disposed in the upper surface so as to provide light to the surrounding cooking facilities and support surface or table region 14. In this manner, the apparatus is ideally configured for locating at a focal region within an entertaining space to maximise the number of people that can use the facility from all sides simultaneously, thereby enjoying the ambiance of the fire as well as being able to cook their selected food items to their own taste while they bond with the others there.

One advantage of having a generally circular configuration, which would include hexagonal or octagonal structures and similar, is that the shape lends itself to incorporation of a "lazy Susan" style rotatable table element that is ideally positioned between the fixed table region and the hot plates. This facilitates easy sharing of a variety of raw food elements and condiments etc.

Further, while a general layout having a centralised fire receptacle with peripherally surrounding cooking and support surfaces is ideal to maximise the number of simultaneous users, variations to suit the location, such as embodiments adapted for positioning against walls or in corners, are also contemplated.

It will of course be appreciated that the interactive apparatus of the invention can be configured for use with any suitable fuel source including, for example, solid fuels such as charcoal or wood or liquid/gaseous fuels such as bottled or fixed line butane or natural gas and, for the fire pit in particular, methanol.

With the solid fuel embodiments, the fire pit enclosure 10 and cooking facilities 11 will all be provided with fuel retaining receptacles appropriately configured to enable the required air flow to support combustion and facilitate removal of the waste products and ash.

Figure 3:
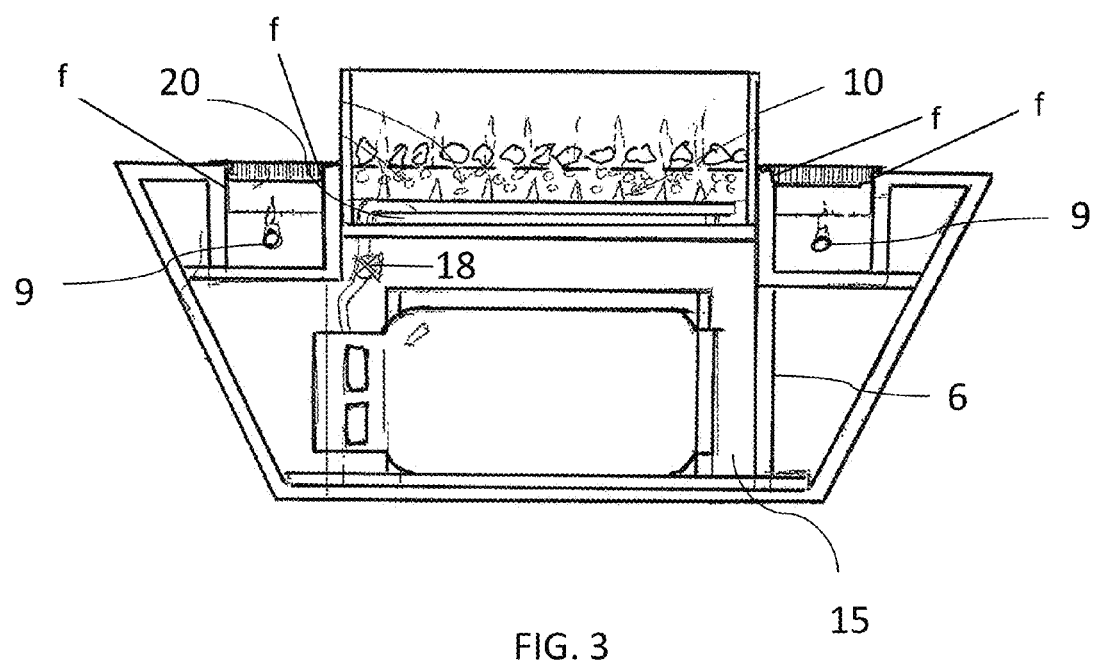
FIG. 3 is a front sectional view of the apparatus shown in the previous figures configured for use with bottled gas.
Figure 4:
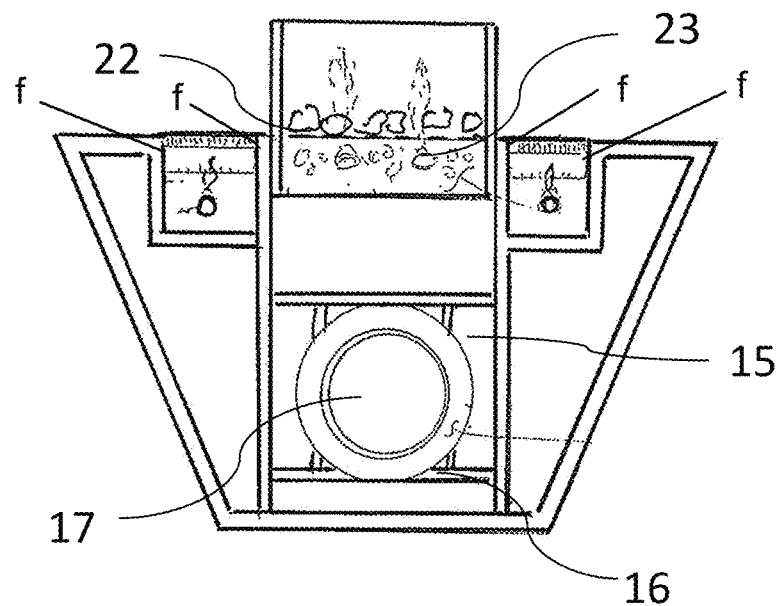
FIG. 4 is a side sectional view of the apparatus shown in FIG. 3.

However, the preferred forms are configured for use with gaseous fuels and one suitable arrangement for use with bottled gas is shown in the sectional views illustrated in FIGS. 3 and 4.

As can be seen in these figures, the apparatus includes a storage space 15 including a support structure 16 for housing a cylinder of gas 17. Included within the structure is a gas distribution manifold 18 which directs gas from the cylinder, via an appropriate regulator, to the various cooking regions 19 below the hot plates 12 and grates 13, as well as to a burner outlet 20 in the fire pit 10. The gas flow is activated via external switches 21 as shown in FIGS. 1 and 3 and can be configured to isolate various regions so that not all of the fire pit burners and cooking surfaces need be operated simultaneously.

The fire pit enclosure of this gas fuelled embodiment includes a grate element 22 which supports decorative non combustible feature elements such as rocks, synthetic firewood elements or glass pebbles 23 over the burners as shown.

The cooking regions can include chamber regions surrounding the gas burners which are configured adjacent the top opening to support re-useable grates and hotplates of the kind regularly used in barbeque structures that are typically made from a heavy cast alloy.

In a particularly preferred form, at least the upper elements of the cooking surface are made from a full bodied porcelain material which has the advantage of being easy to clean, generally non porous and durable without needing any potentially undesirable surface coatings etc.

Alternatively, the apparatus can be configured for use with disposable cooking apparatus elements, such as the kind described in more detail with reference to FIGS. 7 and 8.

In one preferred embodiment, the apparatus includes one or more removable covers (not shown) for conversion of all or part of the upper region of the apparatus into a table surface. For example, in one embodiment, the protruding fire pit shield element is removable such that a single piece cover can be applied across the full upper surface which turns the entire apparatus into a table which is ideal for summer eating. In another embodiment, an annular cover element is supplied which seats over the cooking surfaces, or cooking and support surfaces, to provide an extended peripheral table region through which the fire pit region can still extend and be used. In such embodiments, an optional additional cover may also be provided which goes separately over the fire pit region when that is not in use, which can be used with or without the peripheral cover. The support surface, and/or cover elements can also optionally include, or be adapted to receive, accessories such as utensil holders or sauce holders etc.

Subject to the particular selection of materials used for the different elements of the interactive heating and cooking apparatus and the fuel types to be used, it may be desirable to also include some form of fire protection material in the apparatus, particularly between some or all of the following items including: the fire receptacle, the shield element (particularly if made of glass), the cooking facility and the support surface adjacent the cooking facility While there are numerous suitable fire protection materials, silicone based materials of the kind used for fire protection in the aerospace industry are particularly preferred. The material may be in sheet form and can be inserted in locations at or between some of the adjacent surfaces discussed above as shown, for example, by reference f in FIGS. 3 and 4.

It may also be desirable to include heat insulation materials to limit the heat transfer to areas where it is not wanted or desirable and concentrate it within areas where it is required and beneficial. Again there are numerous suitable materials available including glass fibre batting materials and the like.

Figure 8:
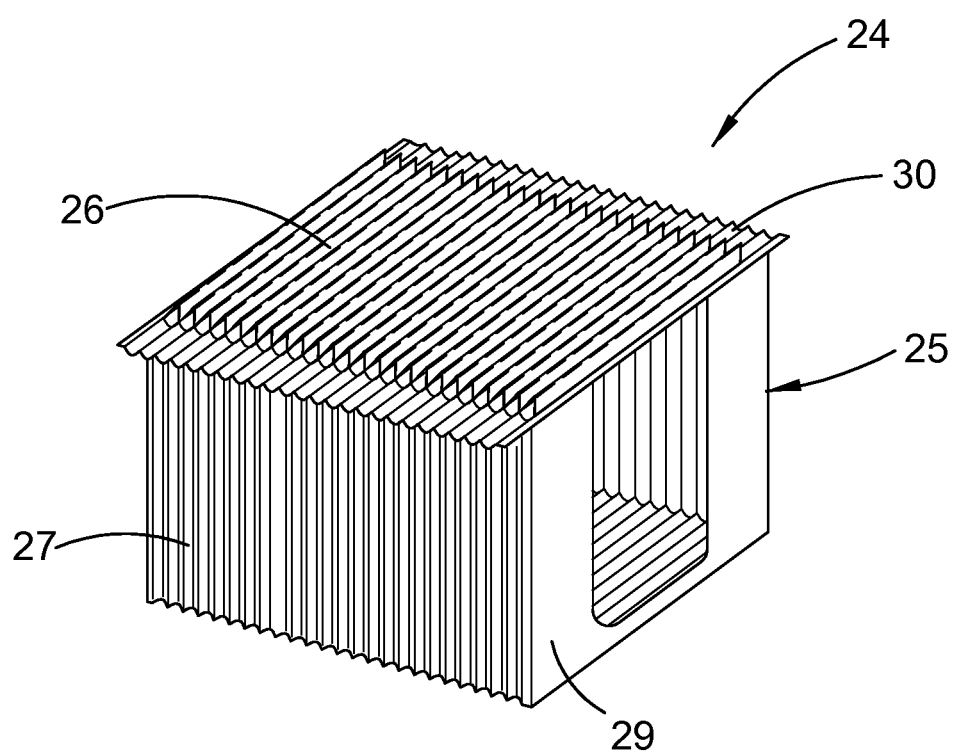
FIG. 8 is a front perspective view of a disposable cooking apparatus in accordance with a second aspect of the invention shown in a collapsed storage state.
Figure 9:
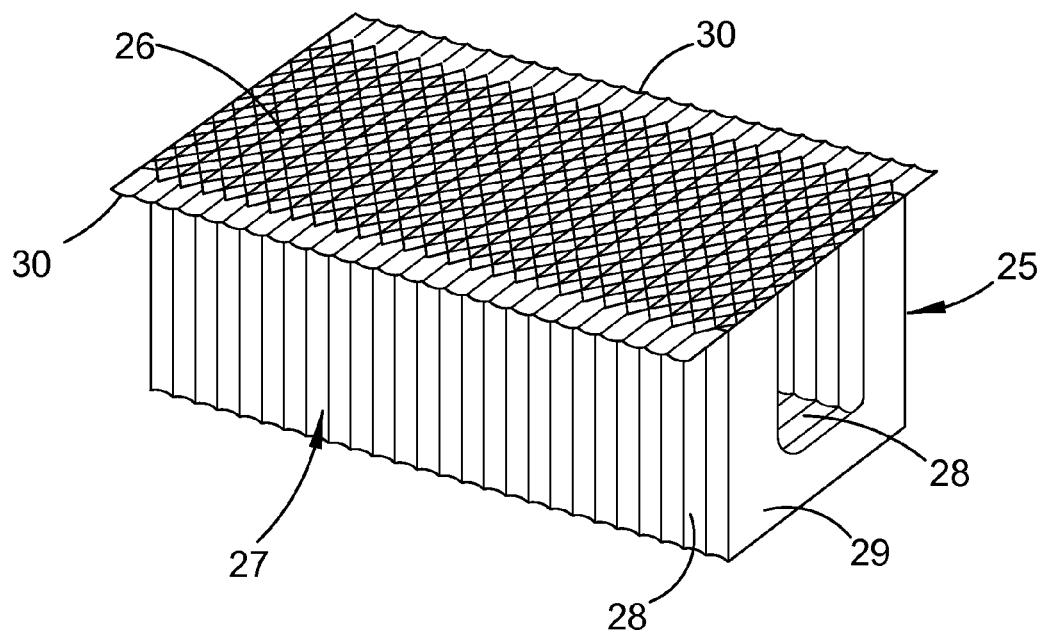
FIG. 9 is a front perspective view of the cooking apparatus shown in FIG. 8 shown in an expanded orientation ready for use.

Turning next to the last two representations, FIG. 8 shows a preferred embodiment disposable cooking apparatus 24 with tray element 25 and integral mesh surface 26 shown in the collapsed position, and FIG. 9 shows the same apparatus in its expanded in use orientation.

As can be see the drip tray element 25 is formed from a longitudinally extendible concertina type generally channel shaped structure 27.

In the preferred form this concertina type channel shape structure is fabricated from a flexible fire resistant material such as aluminium foil and is reinforced with a plurality of discrete u shaped wire or rod like elements 28. However, in other embodiments the reinforcements may be in the form of a continuous wire, or any other arrangement which will permit the apparatus to be collapsed when not in use and easily expanded into position when required.

In the illustrated form the channel shaped structure incorporates end formations 29 that extend at least partially across the channel section so as to prevent leakage of product collected in the tray during use.

The drip tray is configured to support and, optionally, retain, a cooking surface in the form of a mesh element 26 that extends across the top opening of the expanded tray. The mesh element is similarly collapsible and extendable during use. Such support may be in the form of flange formations that extend either across or away from the channel opening during use such as the outwardly extending flanges 30 shown in the drawings. The mesh 26 may be connected to the tray element flanges 30 by any suitable means including crimping, welding, gluing etc.

The expandable disposable cooking apparatus above can be used in part, or in its totality, as part of the cooking facilities for the first aspect of the invention as described above. In such embodiments, tray only versions can be inserted into the openings below the grates provided with the interactive apparatus, making it easy to clean below the grates after use. Alternatively, versions that include the tray and mesh such as shown in FIGS. 7 and 8, can be used in place of the reusable grates 13, making cleaning after use a simple case of disposing the used disposable tray and mesh and replacing these with new ones when the apparatus is next to be used. In such cases the apparatus of the first aspect is provided with cantilevered burner manifolds with an access opening adjacent the free end. In this manner the tray and mesh apparatus is inserted in its collapsed state into the access opening and expanded over the manifold in a similar manner to putting on a sock as suggested in FIG. 8. For long lengths of burner, several separate disposable tray and mesh apparatuses can be inserted and if necessary one deformed slightly into the end of the adjacent one to provide a nesting interconnection.

It will also be appreciated that the disposable cooking apparatus, particularly the versions with integral mesh cooking surface, lends itself to use separate from the apparatus of the first aspect of the invention. For example, the tray once expanded could be filled with charcoal or other fuel elements and thereby create an easily transported barbeque device that can be simply thrown away or recycled after use. In such instances the shape need not be generally longitudinal, but could expand into a square or wider generally rectangular tray structure. Furthermore, the fact that the apparatus can be stored in a collapsed state makes storage easy and efficient. This would enable people to keep packages in the car ready for impromptu use when travelling or on a picnic. In other embodiments, simple supported cantilevered bar like gas burner manifolds could be produced for use with the disposable cooking apparatus. The end result would still be a structure that is far more compact than most portable barbeques being only a bar manifold and gas bottle and would eliminate any issues relating to transporting dirty barbeque equipment in the car after use, as the elements contaminated with the food can simply be disposed.

It will be appreciated that the interactive heating and cooking apparatus of the present invention has numerous advantages over the existing prior art.

For example, it enables provision of really hot food for everyone at the same time. This is particularly relevant during winter when cold conditions cause food to lose its heat rapidly with taste and texture also deteriorating prior to consumption.

The apparatus also provides light to all the users, ensuring the best cooked results and eliminating the need for separate lights or torches which are not only inconvenient, but usually provide a quality of light that is quite harsh and unappealing.

The apparatus also encourages interaction over meals and an extended time of conversation whilst still enabling a watchful eye to be kept on the cooking.

The flames in the fire pit can also be regulated to provide variations in warmth according to temperature variations and reduced to a more subtle level once the cooking has been completed.

It enables diners to dividually select their choice of food, instead of having to eat what's prepared for them.

Also, everyone partakes in the cooking doing it together, which means faster cooking and lesser loads on single individuals.

Addition of the optional removable covers/table top elements, with or without incorporating a removable fire pit shield element further increase the versatility of the apparatus by enabling simple conversion to a more conventional table idea for summer dining when a barbeque facility is not required.

Similarly, the collapsible disposable tray offers a means to make cleaning of the interactive cooking and heating apparatus much easier, thereby reducing the chances of attracting insects and the like after use. The same concept also enables provision of a standalone disposable cooking apparatus that is compact to store and transport while also eliminating the need for post use cleaning.

It will be appreciated that while both aspects of the invention have been described with reference to preferred examples, both aspects can be embodied in numerous other physically different forms falling within the inventive concepts.

The invention claimed is:

1. An interactive heating and cooking apparatus including:
   a support structure defining an upper support region;
   a fire receptacle extending at least partially upwardly from the upper support region, the fire receptacle being bounded by a peripheral shield element, the shield element being adapted to allow at least a portion of the light from a fire in the fire receptacle to pass there through;
   at least one cooking surface with an associated independently operable heat source separate from and external to the fire receptacle, the cooking surface being positioned adjacent said peripheral shield element positioned to receive light from the fire; and
   at least one support surface adjacent the cooking surface.

2. An apparatus according to claim 1 wherein the support surface is sized to support cooking and eating supplies and utensils.

3. An apparatus according to claim 1 wherein the support surface extends peripherally beyond the underlying support structure so as to act as table surface at which users can optionally sit.

4. An apparatus according to claim 1 wherein the fire receptacle is approximately centrally located on the support structure with the cooking surfaces and support surface are disposed peripherally thereto to enable access and use by a maximum number of users.

5. An apparatus according to claim 1 having a generally circular configuration in plan view.

6. An apparatus according to claim 5 wherein the support surface includes a rotatably moveable "lazy Susan" type tray element.

7. An apparatus according to claim 1 wherein the cooking surface is a barbeque type structure incorporating solid and/or open cooking grates.

8. An apparatus according to claim 1 wherein the fire receptacle shield element is made from tempered glass.

9. An apparatus according claim 1 wherein the fire receptacle shield element is made from a perforated heat resistant material.

10. An apparatus according to claim 1 configured for use with gaseous fuels.

11. An apparatus according to claim 1 wherein the fire receptacle is adapted to support non combustible aesthetic fire resistant media.

12. An apparatus according to claim 1 including one or more cover elements for conversion of the cooking region and/or fire pit into an additional table region.

13. An apparatus according to claim 1 including cooking accessories, or means to retain cooking accessories.

* * * * *